United States Patent [19]
Broddin et al.

[11] Patent Number: 5,901,275
[45] Date of Patent: May 4, 1999

[54] CLUSTERED DOT AND LINE MULTILEVEL HALFTONING FOR ELECTROGRAPHIC COLOUR PRINTING

[75] Inventors: Dirk Broddin, Edegem; Frank Deschuytere, Beveren, both of Belgium

[73] Assignee: Agfa-Gevaert N.V., Mortsel, Belgium

[21] Appl. No.: 08/430,081

[22] Filed: Apr. 27, 1995

[30] Foreign Application Priority Data

Apr. 27, 1994 [EP]  European Pat. Off. .............. 94201151

[51] Int. Cl.⁶ ................................... H04N 1/46
[52] U.S. Cl. .................... 395/109; 395/117; 358/534; 358/536
[58] Field of Search .................... 358/533, 534, 358/456, 454, 535, 536, 298, 459, 457, 458; 382/162; 395/107, 117

[56] References Cited

U.S. PATENT DOCUMENTS

| | | | |
|---|---|---|---|
| 4,974,067 | 11/1990 | Suzuki | 358/458 |
| 5,055,923 | 10/1991 | Kitagawa et al. | 358/534 |
| 5,258,850 | 11/1993 | Tai | 358/459 |
| 5,404,156 | 4/1995 | Yamada | 358/534 |
| 5,444,552 | 8/1995 | Smith, III | 358/534 |
| 5,587,811 | 12/1996 | Liguori | 358/456 |

*Primary Examiner*—Edward L. Coles
*Assistant Examiner*—Cheukfan Lee
*Attorney, Agent, or Firm*—John A. Merecki

[57] ABSTRACT

A method is disclosed for rendering monochrome or colored continuous tone images by a system having restricted continuous tone rendering capabilities, such as electrographic printers capable of printing more than two density levels on each addressable micro dot. A method for preferred halftone dot growth is described, starting from isolated dots arranged along base lines and auxiliary lines, evolving to high density lines along the base lines and approximating full continuous tone rendition for high density regions. Preferred arrangements for the orientation, spacing and absolute location of the base lines and auxiliary lines are disclosed and a method to generate preferred arrangements. A moire free combination of three halftone images is described for the reproduction of color images. A method to select a restricted set of energy levels to obtain linear reflectance response is disclosed. Halftone cells are arranged in supercells to improve the density resolution of the system.

12 Claims, 8 Drawing Sheets

2D modulation

1D modulation

2D modulation

CLUSTERED DOT AND LINE MULTILEVEL HALFTONING FOR ELECTROGRAPHIC COLOUR PRINTING

FIELD OF THE INVENTION

The present invention relates to image rendering systems having the capability to render consistently only a restricted amount of density levels in a black and white or colour reproduction of a continuous tone image. More particularly the methods of the invention can be used in an electrographic printer having multilevel capabilities.

BACKGROUND OF THE INVENTION

The reproduction of continuous tone images is traditionally done by full contone reproduction such as colour photo prints or by binary halftoning techniques such as colour offset printing. Electrographic printing, where a latent image is formed by static electricity that is locally discharged to form graphical representations, has an important member called electrophotographic printing. In electrophotographic printing, the static energy is partially removed by a directed light beam. Electrophotographic printers have traditionally a capability of binary printing. The illusion of continuous tone images is reached by binary halftoning techniques. Every addressable spot on the output, further called micro dot, can get a high density corresponding with full toner coverage or a low density corresponding with the absence of toner.

Recently, electrographic printers have also limited contone capabilities. That means that the amount of toner per micro dot can be modulated more continuously, such that the micro dot—after rendering—can have apart from a low density and a high density also some mid densities. The density level can be regulated by an energy level that is applied to the micro dot by an output device. Agfa-Gevaert N.V. from Mortsel Belgium markets such an electrophotographic printer under the trade name Chromapress. This is a duplex colour printer (cyan, magenta, yellow, black) having a resolution of 600 micro dots per inch producing 1000 A3 pages per hour. Per micro dot, 64 energy levels can be selected. The output device can be also a thermographic printer, inkjet printer, more generally an electrographic printer etc. The problem with the mid densities is that these are not stable as a consequence of the physics of the electrographic process. By instability is meant that there is not a one to one relation between the energy level applied to the device and the density level obtained on the reproduction. The density level of a first micro dot is strongly dependent on the energy level applied to the micro dots in the direct neighbourhood of the first micro dot. Therefore several methods have been proposed to enhance the stability of the micro dots. This can be done up to a certain limit dependent on the density level. An important aspect of the remaining instability is that not enough density levels per micro dot can be rendered. Therefore a technique related to binary halftoning must be used, which is called multilevel halftoning. A problem with halftoning is that the spatial resolution is decreased to improve the density resolution. Another problem is that internal moire can show up due to the interaction between the micro dots and the halftoning pattern. These problems have been addressed in WO-A-93 26116, for multilevel halftoning of images having one colour component. FIG. 7 of that application discloses a 3-bit grey halftone dot layout according to a mixed dot type embodiment. For low output densities, isolated halftone dots appear on a background. The halftone dots comprise microdots having two different density levels. For higher output density levels, isolated bands appear and for the highest densities, maximum two different density levels are present in each halftone cell.

However, if different colour components are printed on top of each other to get colour reproductions, colour moire can occur between the different components. This problem is not addressed in the above mentioned application. Colour moire or inter image moire is different from internal moire, as will be described below.

EP-A-0 370 271 discloses the formation of halftone dots to prevent rosette moire and colour shift, but is related to binary halftoning. Problems of stability of micro dots and aliasing of line structures by use of multiple levels are not addressed in this application.

OBJECTS OF THE INVENTION

It is a first object of the invention to render images with a consistent and predictable density on the reproduction.

It is a second object of the invention to optimise the spatial resolution while keeping the density resolution as high as is necessary to guarantee the impression of continuous tone image reproduction.

It is a third object of the invention to eliminate internal moire and inter image moire.

It is a fourth object of the invention to make the reproduction obtained from the combination of several colour components less registration dependent thereby avoiding line structure aliasing.

SUMMARY OF THE INVENTION

In accordance with the present invention, a colour or multi tone reproduction is disclosed comprising at least three halftone images printed on top of each other, wherein each of said images is rendered on a recorder grid of micro dots and comprises isolated halftone dots wherein:

- the area outside the halftone dots has a minimum background density $D_{min}$;
- the halftone dots include at least one micro dot having a density level $D_1$ and at least one micro dot having a different density level $D_2$, $D_1$ and $D_2$ both higher than $D_{min}$;
- the centers of the halftone dots are arranged along a first set of parallel equidistant base lines having a first orientation and along a second set of parallel equidistant auxiliary lines having a second orientation different from the first orientation;
- the points of intersection of any base line with any auxiliary line have an identical relative position with respect to the micro dot closest to said point of intersection.

The requirement that the halftone dots are isolated and composed of two different densities makes that unstable micro dots can be stabilised by stable micro dots with higher density. The requirement of identical relative position reduces or eliminates the internal moire. Other advantages will become clear from the detailed description below.

In a lot of printing or image rendering devices, the density on the carrier is obtained via a process in which the energy is modulated spatially to obtain spatially varying densities on the carrier. For thermography, thermosublimation, thermal transfer processes etc., energy is applied to a thermal head or the like. Usually, the more energy is applied, the higher the density on the carrier. For electrophotography, a semiconductor drum is loaded by a negative voltage and illuminated by a light source to diffuse the charge, where toner particles must be attracted. Also here, the energy level of the light source impinging on the drum is proportional to the density on the carrier. It is possible that the light source always gives a constant light power, but that the amount of energy on the semiconductor drum is modulated by deflection of the light source towards or away from the drum. It is possible to think of systems where an increasing energy level gives a lower density level on the carrier. The embodiments set out for this invention can be used also for this type of devices.

DETAILED DESCRIPTION OF THE INVENTION

The invention is described hereinafter by way of example with reference to the accompanying figures wherein.

It has been found that the stability of isolated micro dots increases as their density increases. If no energy is applied to the micro dot, generally no toner will be attracted to the location of this micro dot. If the maximal energy is applied, toner particles will totally cover the micro dot. If a low energy level is applied, the amount of toner particles can fluctuate randomly between broad limits. The more toner particles are deposit on the micro dot, the higher the density reached on this particular micro dot. Moreover, it has been found that micro dots, getting a low energy level, behave differently depending on the energy levels applied to micro dots in their neighbourhood. Micro dots getting a high energy level render more consistently the same density, independent from the neighbouring micro dots. Further research revealed that micro dots, getting a low energy level, become more stable when they are adjacent to a micro dot with high energy level. By adjacency is meant that the micro dots touch each other side by side or by a corner point. Therefore it is advantageous to divide the printable area in halftone cells, each cell comprising the same amount of micro dots and redistribute the density of the individual micro dots in one halftone cell such that the average density—averaged over the micro dots of one halftone cell—approaches the average density required for the reproduction of the image. A low average density can be reached by two extreme arrangements:

(1) one or more micro dots in the halftone cell get the highest possible density; the other micro dots in the halftone cell get the lowest possible density, except for one micro dot that gets an intermediate density so that the average density approximates the required density.

(2) all micro dots get essentially the same density such that the required density is equally distributed over all micro dots.

The first method creates stable density levels but reduces the spatial resolution to the size of the halftone cells. The second method preserves the spatial resolution, but low densities will randomly fluctuate between broad limits. Method (1) is absolutely necessary for low density levels, while method (2) can be used for high densities without quality degradation. Therefore, in low densities a first one micro dot of a halftone cell is raised to a stable density, before a second micro dot in the halftone cell can get a small density to increase the average density of the halftone cell. From a certain average density level, the micro dots surrounding the first stable micro dot can get an increasing density. This means that in low densities, only the first micro dot in each halftone cell will be visible. In higher densities, this first micro dot and micro dots clustered around this first micro dot will be visible. Because all halftone cells are arranged in the same way and repeated periodically in two dimensions over the whole reproduction, one will notice in low density regions a regular mesh of spotlike zones.

As the average density increases, the area of the micro dots contributing to the average density increases. The shape of these clustered micro dots can be round, square, elliptical, elongated etc. We have selected an elongated shape evolving towards a line screen, because a line screen makes the combination of colour components in a colour reproduction less registration dependent. This means that in medium densities equally spaced parallel lines of micro dots having a high density are visible. Adjacent to these lines, the micro dots have a lower density. The stability of the latter micro dots is secured by the high density micro dots along the parallel lines.

When the density gets higher, the average density can be more and more equally distributed over all micro dots constituting the halftone cell. This has the effect that the space between the parallel lines gets filled with micro dots having a higher density and that the lines seem to disappear.

The above described arrangement of the micro dots in a halftone cell can be obtained by the combination of two line screens. A line screen is a screen for which the density along a fixed direction, called the screen angle, remains the same for all points along a line in that direction. The density varies from low density to high density along every line in a direction orthogonal to the screen angle. For photomechanical reproduction, the light reflected or transmitted by the original continuous tone image is directed to the line screen. The light is attenuated proportionally to the local density of the line screen, and the attenuated light is directed to a photosensitive material. The combination of the two line screens can be realised by putting them on top of each other with different screen angles or by applying the first line screen, developing the photosensitive material and then modulating the light from this photosensitive material by the second line screen under a different angle. This will render small dots in the low density regions, line structures in the medium densities and a continuum in the highest densities.

The same principles can be applied to characterise formation of the micro dots in a halftone cell. In electronic imaging this formation can be controlled by a set of N−1 threshold matrices, each matrix having M elements, or by a set of M pixel tone curves, each pixel tone curve having L entries. The value N represents the number of energy levels. For a binary system, N equals 2 and one threshold matrix can describe the evolution of the micro dots within one halftone cell. For a system with 16 energy levels, N=16. The value M represents the number of micro dots in the halftone cell. For a square halftone cell with 4 pixels and 4 lines of micro dots, M=16. The value L represents the number of digital intensity levels $I_{x,y}$ by which the continuous tone image information for location (x,y) on the carrier or one component for colour images is represented. For eight bit systems, L=256, i.e. the grey value of a pixel of the continuous tone image can be represented by digital values from 0 to 255. The representation of the halftone cell by pixel tone curves gives more flexibility than the representation by threshold matrices, because threshold matrices force that the energy level for any specific micro dot does not decrease when the average density level of the halftone cell increases. Moreover, pixel tone curves are faster to convert a pixel level to an energy level. This operation can be done by one look up table operation once the location of the micro dot relative to the halftone cell is known. It is obvious that a set of threshold matrices can be converted to the corresponding set of pixel tone curves and that pixel tone curves that are never descending can be transformed to a set of corresponding threshold matrices.

Figure 1:
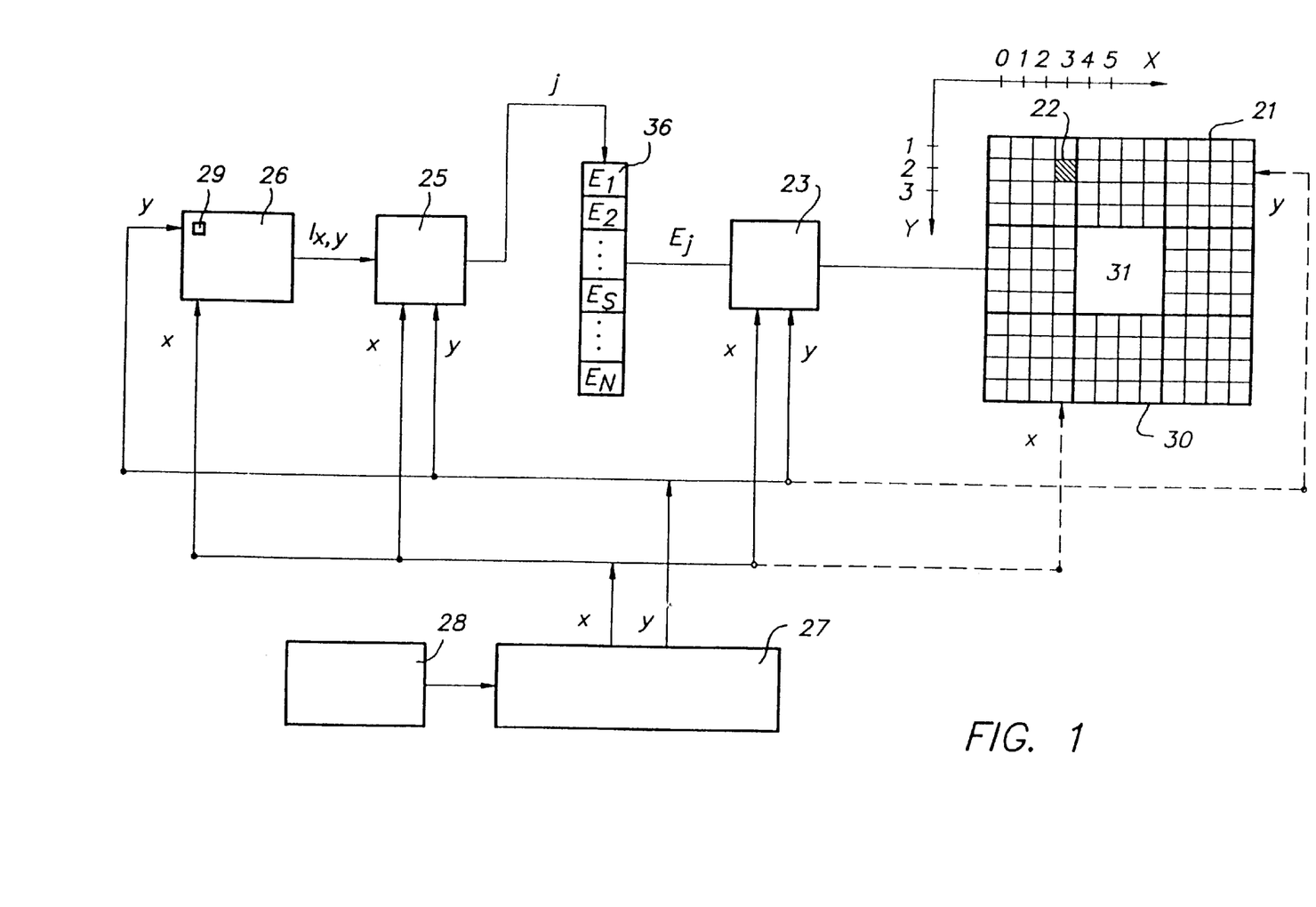
FIG. 1 is a schematic representation of a multilevel halftoning device.

In FIG. 1 is shown how the transformation of a continuous tone image 26 to a multilevel halftone image 30 is realised. The carrier 21 is divided into micro dots 22. Every micro dot 22 on the carrier 21 is individually addressable by the rendering device 23 by an address (x,y). Dependent on the required size and orientation of the reproduction, the resolution of the rendering device and the original resolution of the image data representing the original image, the pixels of the continuous tone image are geometrically rearranged by techniques well known in the art to obtain an image 26 of pixel data 29, each having a location (x,y) and an intensity value $I_{x,y}$. This geometric rearrangement can happen before the conversion to a multilevel halftone image or during the conversion, as the intensity values $I_{x,y}$ are required. This operation makes that for every micro dot 22, there is one input pixel 29.

All micro dots on the carrier are organised in halftone cells 31. In FIG. 1 each halftone cell is composed of sixteen micro dots 22. A clock device 28 generates a clock pulse for every micro dot. At every clock pulse, an address generating device 27, coupled to the clock device 28, generates the coordinates (x,y) for the next micro dot 22 to be imaged. This address (x,y) addresses a pixel 29 of the continuous tone image information 26 and sends its intensity level $I_{x,y}$ to the tone curve transformation unit 25. This unit also receives the address (x,y) and relates this address (x,y) to a micro dot element number i within a halftone cell. For this example, i ranges from 1 to 16, because there are sixteen micro dots per halftone cell. Each micro dot i has a pixel tone curve $L_i$ associated that transforms the intensity level $I_{x,y}$ to an energy index number j, corresponding to energy level $E_j$. As will be discussed later, the energy index j can take a reduced amount of numbers, to address a restricted set of energy levels $E_j$. A table 36 containing these energy levels can be indexed by index j to give energy level $E_j$. That energy level $E_j$ together with the address (x,y) is sent to the rendering device 23, which results in a density written on micro dot 22 on the carrier 21 at location (x,y).

The way the pixel tone curves are filled with values will determine the look of the reproduction. We make use of the concept of line screens to fill up values in the pixel tone curve elements. The procedure is described here in accordance with FIG. 2. For each constant intensity level $I_{x,y}$, we generate one value for each pixel tone curve $L_i$ within a halftone cell. We select a set of equidistant parallel lines e.g. 41, 42 that gives an identical line pattern in every halftone cell 45. The distance, measured along a line orthogonal to the parallel lines, between every two adjacent lines is D. For a given intensity $I_{x,y}$, we define bands 43, parallel to and centered along the parallel lines, having a width W dependent on the intensity level $I_{x,y}$.

Figure 2:
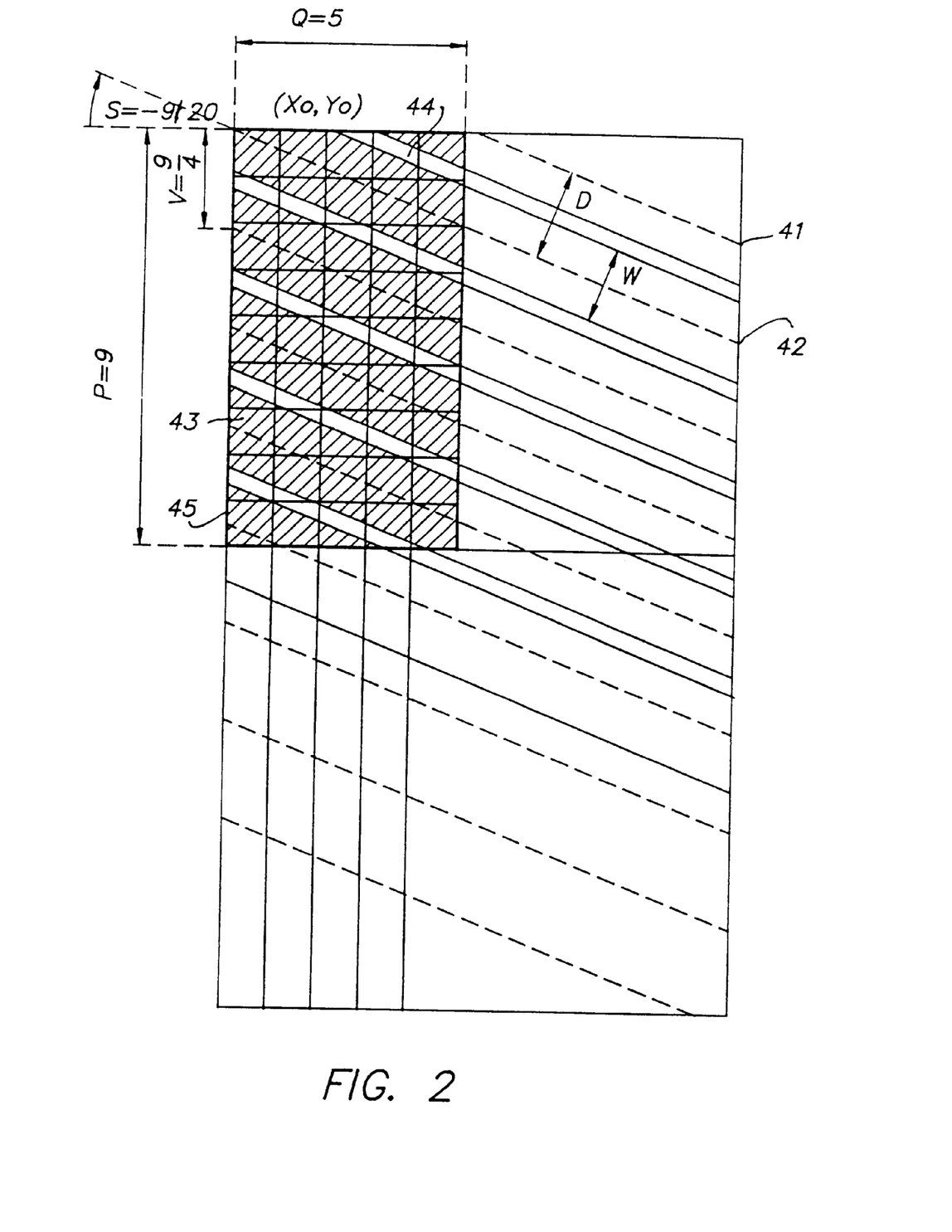
FIG. 2 explains the details of a line modulation technique.

The width W is D for the lowest intensity level;
The width W is 0 for the highest intensity level.

Figure 3:
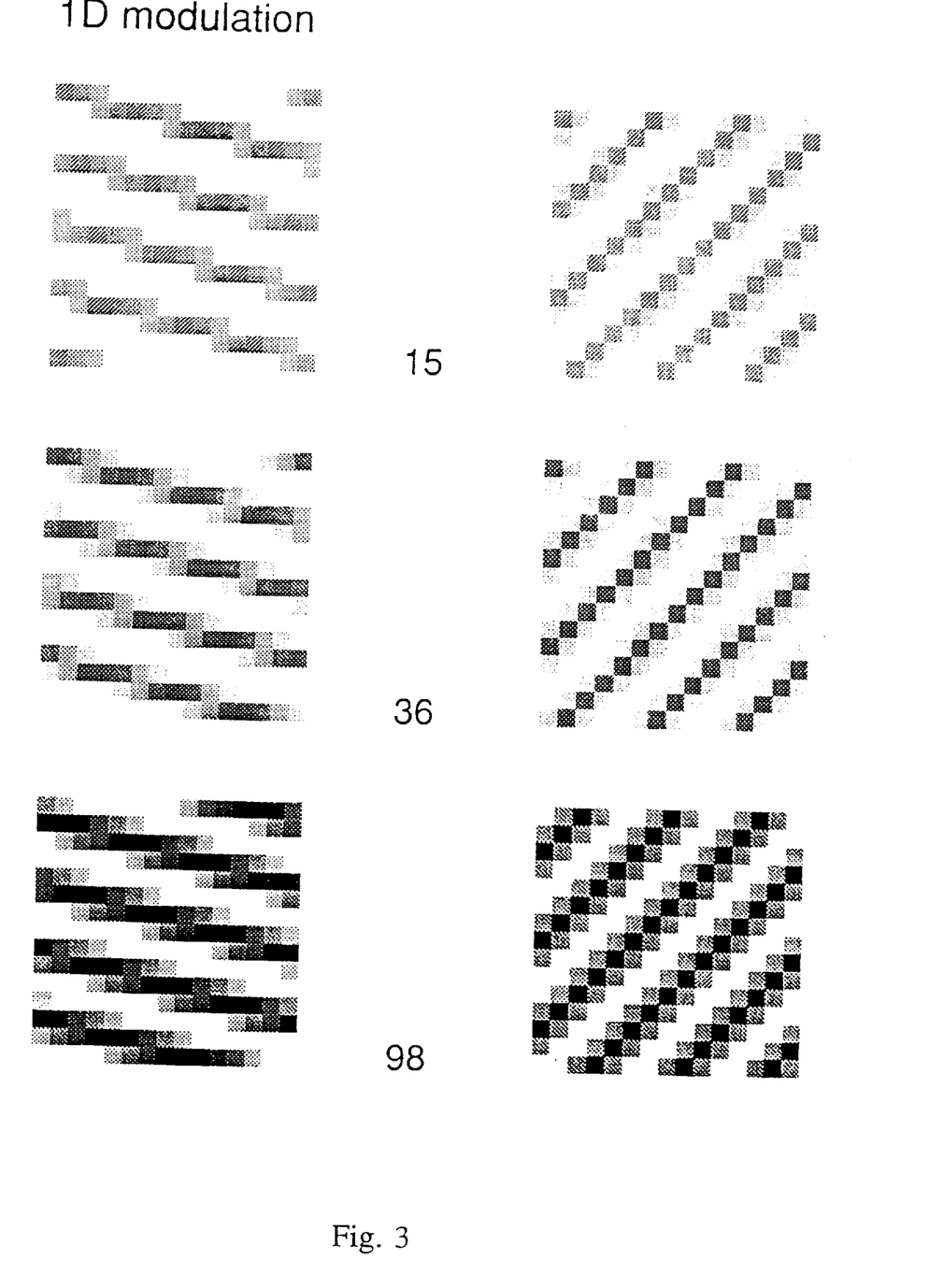
FIG. 3 gives some examples of constant grey images, modulated by a line screen in different orientations.

The width W of each band is further a decreasing function of the intensity level $I_{x,y}$, i.e. W is proportional to (1−I) if I is the linearly normalised value for $I_{x,y}$ such that I has values between 0 and 1. The clause "y varies proportional to x" means that y is an ascending function of x, i.e. whenever x increases, y does not decrease. For this specific case, for the highest density the bands touch each other and for the lowest density there are no bands at all. As can be seen from FIG. 2, each micro dot 44 is covered by one or two bands, depending on the width of the band. It is now the area of this micro dot 44 covered by the bands 43 that gives the amount of density allotted to the specific micro dot. Is the micro dot fully covered by one or more bands, then this micro dot will get the highest possible density. If the micro dot is not covered by any band, then the micro dot will get the lowest possible density. If the micro dot is covered for 50% of its area by the bands, then it will get an intermediate density between the minimum and maximum possible density. This way we can get line patterns as shown in FIG. 3. On a density scale from 0 to 255, resulting line patterns are shown for a density of respectively 15, 36 and 98. On the left side such a line pattern is shown for a line orientation of about 166°, on the right side the line orientation is 45°. This type of one-dimensional modulation gives improved density stability of images. Moreover, the aliasing that can be expected to happen when a line with a certain orientation is imaged on a discrete grid as the one formed by the micro dots, is smoothed by the electrographic process itself, that tends to smear out the toner particles along a band along the line. The toner particles are concentrated along this line and the background deposition further away from the line center is diminished. This has the effect of edge enhancement, originating from the electrical field in the finite developing gap. This method has the effect that the required density is "concentrated" along the parallel lines, giving the lowest density to micro dots more distant from said lines.

Figure 4:
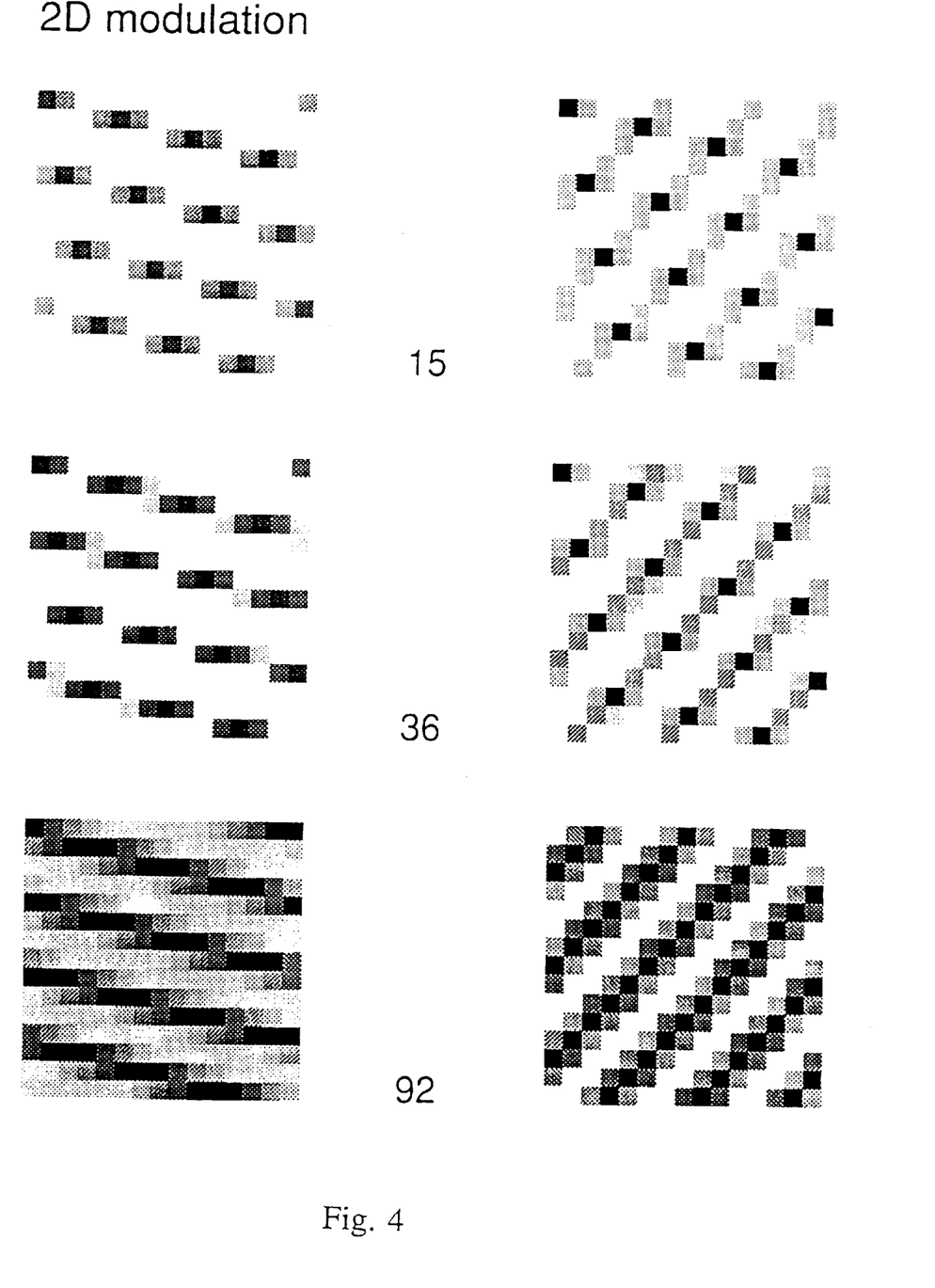
FIG. 4 gives examples of constant grey images modulated by a combination of line screens.

A further improvement can be reached by repeating the above step with lines having a second direction not coinciding with the first direction of the first lines. The density values assigned by the previous method to the micro dots are called $V_1$ and are now used to be modulated by the second set of lines. The width of the second set of bands is now proportional to $V_1$. If $V_1$ is zero, then the bands will have width zero; if $V_1$ is maximal—i.e. the area of the micro dot was totally covered by the first bands—then the second bands have a width equal to the spacing of their center lines. Again for the micro dot having value $V_1$ assigned, the area covered by the second bands is measured, giving a value $V_3$. This value $V_3$ is zero if the second bands do not cover any part of the micro dot. This value $V_3$ is maximal if the micro dot is totally covered by one or more of these second bands. This second modulation "concentrates" the previous linewise densities towards the points where both lines cross each other. This can be seen in FIG. 4, where every figure corresponds to the one of FIG. 3, where the extra line modulation is added. It is obvious from this figure that for low densities (e.g. 15) a periodical repetition of spots appears. For a higher density (e.g. 36) these spots get elongated and start connection to lines. For even higher densities (e.g. 92), the lines are clearly visible and start to fade out to a continuous density all over the reproduction.

Because for higher densities the micro dots are more stable, the densities can be distributed more equally over the micro dots. Therefore the method can be modified in a sense that a homogeneous density distribution is added to the line-wise or dot-wise distribution. The homogeneous distribution gains more importance for higher densities. Therefore, from the value $V_1$ we can derive a value $V_2$ that is a linear combination of the line-wise modulated density $V_1$ and the homogeneous density distribution:

$$V_2 = (1-W_1)*V_1 + W_1*(1-I)$$

$W_1$ is a positive weight factor, not bigger than one. I in (1–I) corresponds to the normalised form of the intensity $I_{x,y}$. This value $V_2$ is now used to define the width of the second bands. Another value for $V_3$ will now be obtained whenever $W_1$ is different from zero. The same method can be applied to the value $V_3$, obtained from the second set of bands for the specific micro dot, giving a modified value $$V = (1-W_2)*V_3 + W_2*V_2$$

It is obvious that the first method is a special case of this modified method, if $W_1$ and $W_2$ are selected to be zero.

Figure 5:
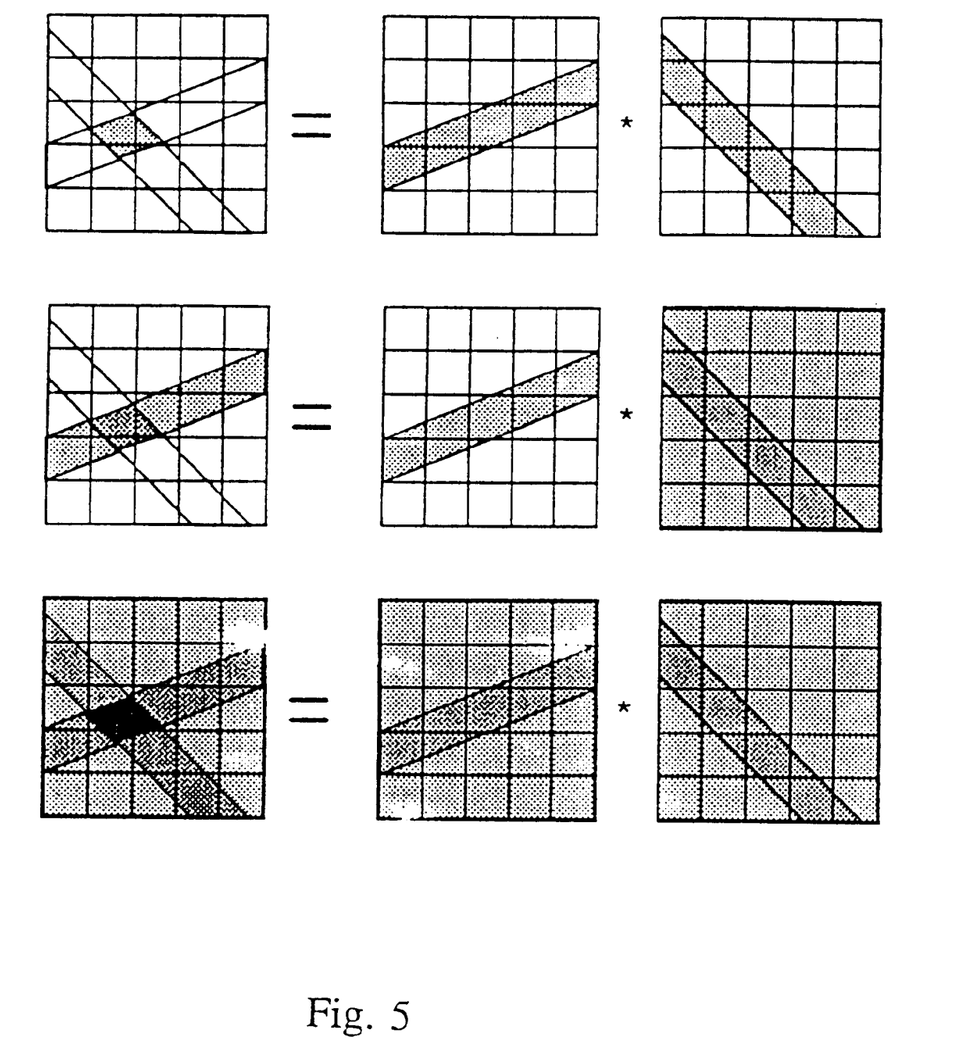
FIG. 5 shows the results of the combination of line screen modulation and full contone modulation.

In FIG. 5, the first row shows what happens if the first method is applied with both weights zero. This figure is effectively correct for low densities. For higher densities, the band like structure becomes more apparent. The diamond common to the two bands is imaged at high density by this operation. The second row shows what happens if the first weight $W_1$ is taken zero and the second taken one. A line screen results. The last line shows what happens if both weights have an intermediate value. It has been found that the best choice for the weights $W_1$ and $W_2$ is increasing with the density. The higher the density, the more the distribution over the halftone cell is allowed to be homogeneous.

The value obtained for V can now be mapped to the available energy levels $E_j$. Preferentially, a limited set of energy levels is selected and fixed ranges of V-values [$V_j$, $V_{j+1}$] are mapped to one energy level $E_j$. If the number of selected energy levels is 16, then four bits suffice to index these energy levels. The pixel tone curves can then transform the input levels $I_{x,y}$ to a four bit value. Usually $I_{x,y}$ is represented by eight bits. This choice gives a saving of 50% memory. In electrographic devices where the energy levels are less stable, it can be advantageous to allocate only four energy levels, reducing the number of bits to represent one micro dot to 2. Other devices having more contone capabilities can output reproductions with increased quality if the number of energy levels is taken 64, requiring six bits per micro dot.

The choice of the angle of the parallel lines and the distance between these lines is first of all restricted by the requirement that these lines have to cover all the halftone cells in the same way. Moreover, it has been found that more restrictions are necessary to avoid internal moire. Internal moire is due to the interaction of the screen—in this case the line screen or the combination of both line screens—with the recorder grid or the micro dots. The preferred arrangement of the isolated spotlike zones—called halftone dots on the analogy of binary halftoning—for this invention is such that they form a periodical structure. More precisely, they are arranged along two sets of equidistant parallel lines. Since for the highlights, one single small and isolated halftone dot comes up per halftone cell, the relative position of the halftone dot with respect to the recorder grid or the micro dots should be equal for all halftone cells. The first set of equidistant parallel lines is called the base lines, the second set of parallel lines, having a different orientation and thus intersecting the base lines, are called the auxiliary lines. Because the base lines and auxiliary lines go through the midpoints of the halftone dots, the center of the halftone dots is situated at the point of intersection of a base line and an auxiliary line. It has been found that—in order to avoid internal moire—these points of intersection or the centers of the halftone dots must be situated on points that have always the same relative position or "spatial offset" with respect to the closest micro dot. In other words, if all points of intersection are translated over exactly the same distance such that one point of intersection coincides with the center of a micro dot, then all points of intersection coincide with the center of a micro dot. We make here the difference between base lines and auxiliary lines, because at medium image densities the micro dots with highest density are arranged along these base lines. Among the micro dots along these base lines there can be also be a density difference. In that case, the micro dots with highest density are situated closest to the auxiliary lines.

This type of arrangement of halftone dots, gradually evolving to line patterns can be used for monochrome images. A combination of these arrangements can be used for multi tone reproductions. In that case one halftone image having one colour will be superimposed on one or more such images having a different colour. It is known from binary halftoning that two halftone images can interfere with each other and produce moire. When a third halftone image is superimposed on the set of two, secondary moire can arise. It has been found that these types of moire can also be produced by multilevel halftone images if the dot or line arrangement for each individual halftone image and the combination is not selected adequately. Specially for colour reproductions composed of three halftone images: a cyan, magenta and yellow component or reproductions composed of four halftone images: a cyan, magenta, yellow and black component, it has been found that at least three of the individual components preferably have the properties for the monochrome halftone image as discussed above. In that case, there are at least three sets of base and auxiliary lines. Like in binary halftoning such as offset printing, only three of the four separations of cyan, magenta, yellow and black are given high weight in the optimisation of the screen. Therefore we emphasize on the role of three separations with their accompanying screen geometry. Each set of base and auxiliary lines can be selected from a set of three or more generic lines. Every set of base and auxiliary lines will produce a set of points of intersection. The relative position of these points of intersection relative to the closest micro dots can be established for every set. In a preferred embodiment, this relative position must be equal for each of at least three colour components.

Also the orientation of the base lines plays an important role when three multilevel halftone images are combined to produce multi tone or more specifically colour images. This is especially true for the mid tone areas of the image, where line-wise structures along the base line show up. First of all it is important that the base line of one colour component is not parallel to any of the base lines of the other two components. Three base lines selected from the three halftone images, such that they have no common point of intersection, form a triangle. In order to have quite similar screen rulings or line rulings and thus also a comparable spatial resolution for the three components of the colour image, it is preferred that this triangle has no obtuse angle. Implementations where the deviations between the spatial screen rulings of the different colour separations are minimal, have the advantage that physical processes such as dot gain are similar for the different separations. Especially in electrography with finite gap magnetic brush development, the development response will be different for screens of different spatial rulings. Geometries as presented here based on triangles without obtuse angle, will therefore benefit from equal development response. Even more preferable, the triangle should approach an equilateral triangle. These conditions restrict the relative orientation of the base lines for different multilevel halftone images with respect to each other.

Furthermore, also the absolute orientation of the base line and the auxiliary line plays an important role in the quality of a single monochrome multilevel halftone image, and thus also in the quality of a multi tone image composed of a set of halftone images. It is preferred that the base line is not horizontal nor vertical. If the base line is horizontal, then the tone curves of micro dots along horizontal lines are equivalent in the first step of the production process of them. This means that the micro dots on the same horizontal line get the same density allotted, equally distributed over these micro dots, and micro dots not on the same horizontal line get densities allotted for another range of image intensity levels. The use of contone according to the method described above is especially beneficial for sloped lines. Therefore, to benefit from the method and in order to keep the characteristics of the different colour separations the same, it is preferred to chose screen angles different from 0° and 90°.

Normally, if four colours are used for printing, then the cyan, magenta and black component have to obey the rules sketched above for optimal rendering. The yellow component is less critical, first because it looks less dense to the human observer and because it has less side absorptions in the visual band. We have found that for the yellow component the halftone cell structure for the black component can be taken and be mirrored along a horizontal axis or a vertical axis or one fixed point or any sloping line at 45°.

A method has been devised to find optimal combinations of angles and distances for a combination of three multilevel halftone images, such that they obey the restrictions sketched above. The method gives distances expressed in micro dot units. The effective screen ruling can be obtained by dividing the recorder grid resolution by the distance between the base lines expressed in micro dot units.

Figure 6:
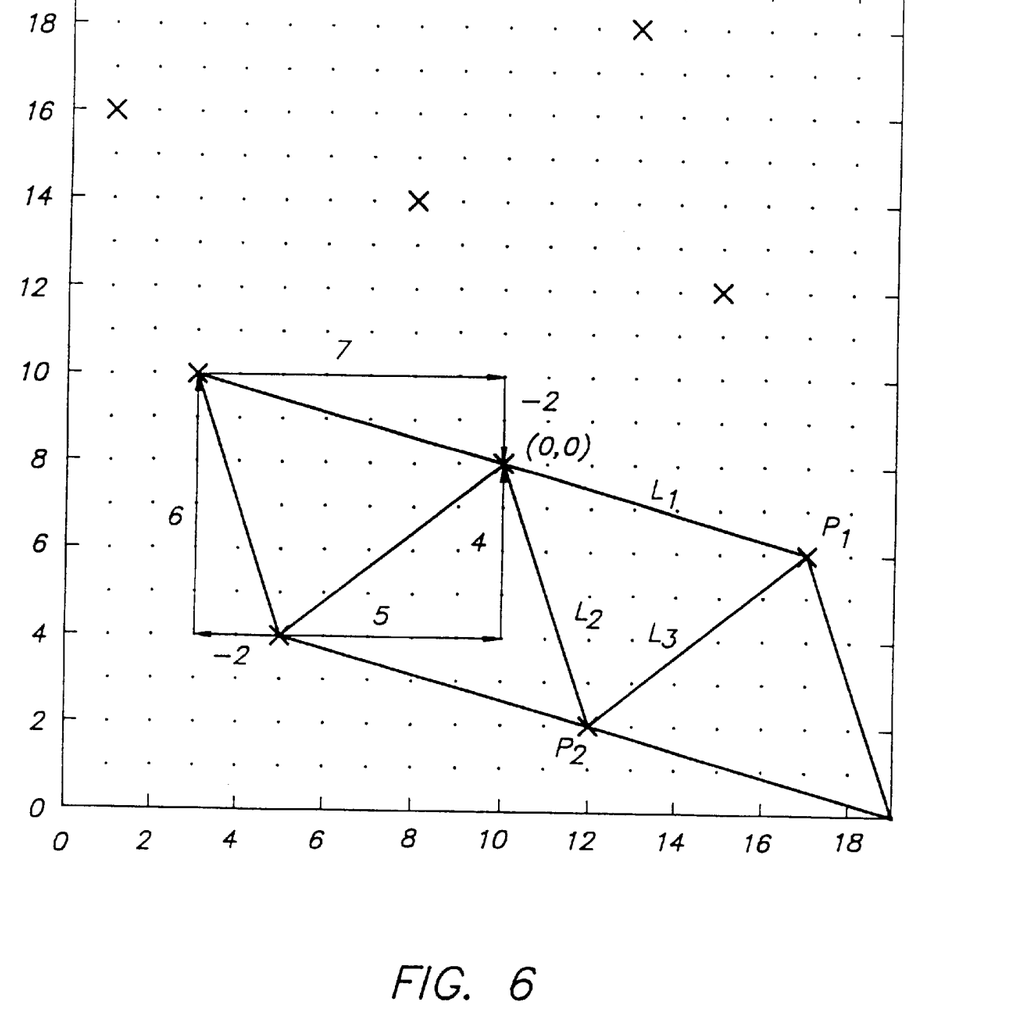
FIG. 6 shows an elementary cell and supercell along with base line orientations for a preferred combination of three screens according to the present invention.

The method finds three generic lines L1, L2 and L3 as shown in FIG. 16.

L1 is selected as the base line B1 for the first halftone image.
L2 is selected as auxiliary line A1 for the first halftone image.
L2 is selected as the base line B2 for the second halftone image.
L3 is selected as auxiliary line A2 for the second halftone image.
L3 is selected as the base line B3 for the third halftone image.
L1 is selected as auxiliary line A3 for the third halftone image.

As shown in FIG. 6, the orientation of L1 is given by a first vector V1 from the origin $(0,0)$ to point P1 $(X_1,Y_1)$. If the origin is situated on the center of a micro dot, the point P1 must be situated also on the center of another micro dot. This means that $X_1$ and $Y_1$ have integer values. This restricts the choice for $X_1$ and $Y_1$ dramatically. This choice is further restricted by the screen ruling that is aimed for. Next all possible positions for a second point P2 with coordinates $(X_2,Y_2)$ are tested. The set of points P2 is restricted by the fact that again both $X_2$ and $Y_2$ must have integer values and that the length $L_2$ of the vector P2 given by $$L_2 = \text{sqrt}(X_2^2 + Y_2^2)$$

must be not too different from length $L_1$ of the vector P1, given by:

$$L_1 = \text{sqrt}(X_1^2 + Y_1^2)$$

From these two vectors P1 and P2, we can derive a third vector P3=P2−P1, with coordinates $(X_2-X_1, Y_2-Y_1)$. We take now the first generic line parallel to P1, the second generic line parallel to P2 and the third generic line parallel to P3. The distance between generic lines L1 is the orthogonal distance of P2 to vector P1. The second generic line is taken parallel to P2. The spacing between generic lines L2 is the orthogonal distance of point P1 to vector P2. The third generic line L3 is taken parallel to vector P3. The spacing between lines L3 is the orthogonal distance of point P1 or P2 to vector P3 through the origin. It is obvious that the spacing between the generic lines is dependent on the length of P1, P2 and P3. If we want equal spacings and thus equal line rulings, the length of these vectors must be equal. In other words, the differences $L_2-L_1$, $L_3-L_1$ and $L_2-L_3$, where $L_3$ is:

$$L_3 = \text{sqrt}(X_3^2 + Y_3^2)$$

must be minimal. Therefore, for every possible vector P2, the following metric is computed:

$$M = [(L_1-L_2)^2 + (L_2-L_3)^2 + (L_3-L_1)^2]/A^2$$

with A=area of the triangle (0,0), P1, P2. The vector P2 that minimizes this metric M is taken as the best candidate for the vector P2. Another preferred way of selecting the best base lines is by listing all combinations $(X_1,Y_1)$, $(X_2,Y_2)$, computing the area for the corresponding parallelogram built upon those two vectors and selecting for each area one combination that gives the best metric. We give here a table of some vectors P1, P2, P3 found by this method, along with the number of micro dots or "cell area" in the halftone cell they define.

It is possible to restrict the $(X_1,Y_1)$ combinations to those where $X_1$ and $Y_1$ are both non-negative and $X_1 \geq Y_1$. After processing, equivalent cell structures can be obtained by interchanging the role of X and Y, meaning mirroring about a line of 45°, by making $X_1$ and/or $Y_1$ negative, or any combination. The corresponding vectors P2 and P3 follow the transformation accordingly.

| $X_1$ | $Y_1$ | $X_2$ | $Y_2$ | $X_3$ | $Y_3$ | Area |
|---|---|---|---|---|---|---|
| 3 | 1 | −2 | 1 | 1 | 2 | 5 |
| 3 | −1 | −2 | −2 | 1 | −3 | 8 |
| 4 | −1 | −3 | −2 | 1 | −3 | 11 |
| 4 | −2 | −3 | −2 | 1 | −4 | 14 |
| 4 | −1 | −3 | −3 | 1 | −4 | 15 |
| 3 | 3 | 2 | −4 | 5 | −1 | 18 |
| 5 | −1 | −4 | −3 | 1 | −4 | 19 |
| 3 | 4 | 2 | −5 | 5 | −1 | 23 |
| 4 | 4 | 1 | −5 | 5 | −1 | 24 |
| 6 | 1 | −3 | −5 | 3 | −4 | 27 |
| 5 | −2 | −1 | 6 | 4 | 4 | 28 |
| 6 | −2 | −2 | 6 | 4 | 4 | 32 |
| 6 | −2 | −1 | 6 | 5 | 4 | 34 |
| 7 | −2 | −2 | 6 | 5 | 4 | 38 |
| 6 | −3 | −1 | 7 | 5 | 4 | 39 |

The halftone cell is exactly the same for the three halftone images and is the parallelogram built upon the vectors P1 and P2. The vector P3 is the shortest diagonal line for this parallelogram. In FIG. 6 the example from the above table is shown where P1=(7,−2), P2=(−2,6) and P3=(5,4). Each elementary halftone cell covers 38 micro dots. These elementary halftone cells can be arranged in a supercell of 19×19 micro dots.

The method described above gives an example to generate pixel tone curves, and results for every micro dot $R_i$ (i=1..M, M=number of micro dots per halftone cell) in a value V per entry $I_{x,y}$ (I=1..L, L=number of possible intensity levels in the input image) in the pixel tone curve $L_i$. More generally, we can state that V=g(x,y,I). Other functions g(x,y,I) can be established using other methods. As said, among all possible energy levels E offered by the rendering device, only a restricted set of N energy levels $E_j$ are really distinct enough to render consistently different densities on the output. Suppose that the halftone cell covers M=11 micro dots, and the number of selected energy levels N=16, then it is theoretically possible to generate M*N=176 different output density levels. Even if the energy levels $E_j$ are optimally chosen, these output density levels will not be equally spaced. If we have 256 input intensity levels, we must map mostly two input intensity levels to one output density level, and due to the non-linear spacing of these output densities, sometimes three or even four input levels must be mapped to one output density level. This can result in contouring and quality loss. The object is to guarantee a correct grey rendering with a restricted amount of energy levels $E_j$.

Therefore it is advantageous to take an amount of S halftone cells together to form a supercell. The number of micro dots in the supercell equals M*S. The higher S, the more different output density levels—averaged over the supercell—can be generated. The number S is selected such that the micro dots can be rearranged to form a square supercell. Each micro dot in the supercell has now a pixel tone curve defined by the function g(x,y,I), that is periodical over all supercells. It is obvious that every pixel tone curve with identical g(x,y,I) values will be present S times in the supercell. Such identical pixel tone curves are called equivalent pixel tone curves. Due to symmetry of the halftone cell, it is possible that the halftone cell itself already contained equivalent pixel tone curves. The function V=g(x,y,I) gives an order in which halftone cell types are formed to give increasing densities. A halftone cell type is the distribution of energy levels over the micro dots of a halftone cell. Each halftone cell type will give a specific average density, averaged over the halftone cell. The halftone cell can be an elementary halftone cell or a supercell composed of elementary halftone cells. To render the lowest density, all micro dots will get an energy level $E_0$. For the next higher density for the supercell, one micro dot must get an energy level $E_1$, while all the other micro dots keep energy level $E_0$. The micro dot having the largest value for V=g(x,y,I) will be the candidate to increase its energy level. Because the supercell is composed of S elementary halftone cells, there will be at least S candidates to increase the energy level from $E_0$ to $E_1$, or more generally from $E_j$ to $E_{j+1}$. Thus, the function V=g(x,y,I) gives only a coarse indication or primary sequence on which micro dot gets an energy increment. When converting the values V=g(x,y,I) just by a kind of truncation to indexes j for $E_j$, which is a type of quantisation of the merely continuous values for V, all micro dots belonging to equivalent pixel tone curves are candidates. If no finer ordering is imposed, this quantisation results in an error in output density. One way of assigning the next higher energy level to a pixel tone curve, is to list them in a sequential order according to the elementary halftone cell where they belong to. But this will always introduce the same pattern in the supercell, which will give visual artifacts in the image. The error function due to quantisation will contain low frequency components that are visually perceptible. It is better to generate an error function that has high frequency components. This error function can be created by superposition of a pattern e(x,y,I) on the function g(x,y,I):

$$g'(x,y,I)=g(x,y,I)+e(x,y,I)$$

The function e(x,y,I) is preferentially selected such that it varies between zero and the minimum difference between different values of the function g(x,y,I) in any different points $(x_1,y_1)$ $(x_2,y_2)$. This means that the error function imposes a sequence on equivalent tone curves or identical V=g(x,y,I) values, but the error function does not change the order imposed by the function g(x,y,I).

In a preferred embodiment, the error function e(x,y,I) is not dependent on the intensity level I and as such e(x,y) is only dependent on the location (x,y) of the micro dot within the supercell. This way the same subordinate sequence is imposed on all identical g(x,y,I) values, whatever the intensity value might be.

In a more preferred embodiment, the error function e(x,y) varies according to the sequential numbering in a Bayer matrix. A Bayer matrix is well known in the art (see e.g. "An optimum method for two-level rendition of continuous-tone pictures" by B. E. Bayer in Proceedings IEEE, International Conference on Communications, Volume 26, pages 11–15, 1973) for cell sizes that have a width and height that is a power of two. If the supercell size is not a power of two, we can define a generalised Bayer matrix as one with a bigger size being the next power of two and with a subsection taken that covers the supercell. It is also possible to define a function over integer values 1..8 that returns the traditional Bayer matrix for values 1, 2, 4 and 8, and that gives a generalised Bayer matrix for other values. This function can be used to generate a generalised Bayer matrix if the supercell size can be decomposed in prime numbers lower than eight.

Another quality improvement can be reached when the Bayer matrix is randomized in the following way. Each smallest Bayer submatrix—this is a 2×2 matrix if the supercell size is a multiple of 2, this is a 3×3 generalised Bayer matrix if the first prime factor for the supercell size is 3, etc..—is randomized. That means that the sequence numbers are randomly permuted. For a 2×2 submatrix, there exist 4!=24 permutations. A traditional white noise random generator can be used to generate numbers from 1 to 24 to select randomly one of the possible permutations for every submatrix in the Bayer matrix. This has the advantage that no aliasing effects can be observed due to the screen ruling imposed.

The process for establishing the pixel tone curves can be summarized as follows:

(1) Define supercells having micro dots $R_{x,y}$ (2) Compute for every micro dot $R_{x,y}$ a pixel tone curve $G_{x,y}$=g(x,y,I) according to a function that maps an input intensity level I to an output density g(x,y,I) for the micro dot at location (x,y). The value g(x,y,I) indicates the order in which the energy level $E_j$ must be increased to energy level $E_{j+1}$.

(3) Add an error function e(x,y,I) to each pixel tone curve $G_{x,y}$ to obtain $G'_{x,y}$. This error function imposes a subordinate order for which micro dot increases its energy level from $E_j$ to $E_{j+1}$.

(4) Assign energy levels $E_j$ or indexes j to the pixel tone curves $L_{x,y}$ in the order as indicated by the function $G'_{x,y}$.

As stated above, a restricted set of M energy levels must be selected from all possible energy levels. It has no sense to use all possible energy levels because the variation of densities produced by one energy level overlaps too much with the variation of the next possible energy level. By selecting a restricted set of energy levels, the number of bits in the bitmap representing the halftone image can be reduced. The number of energy levels is chosen in function of the contone capabilities of the output device. If the variation in density for different energy levels is small, then the restricted set can contain a big amount of energy levels, typically 64. Normally 16 energy levels are selected. This has the advantage that the energy level for two micro dots can be stored in one byte of eight bits. In systems with poor contone capabilities, typically 4 energy levels will be selected.

Figure 7:
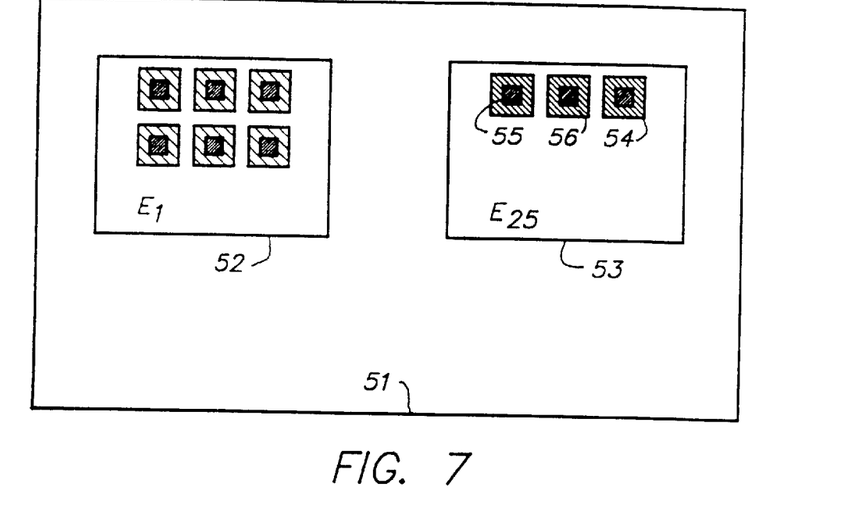
FIG. 7 shows a test page for selecting a restricted set of energy levels $E_j$.
Figure 8:
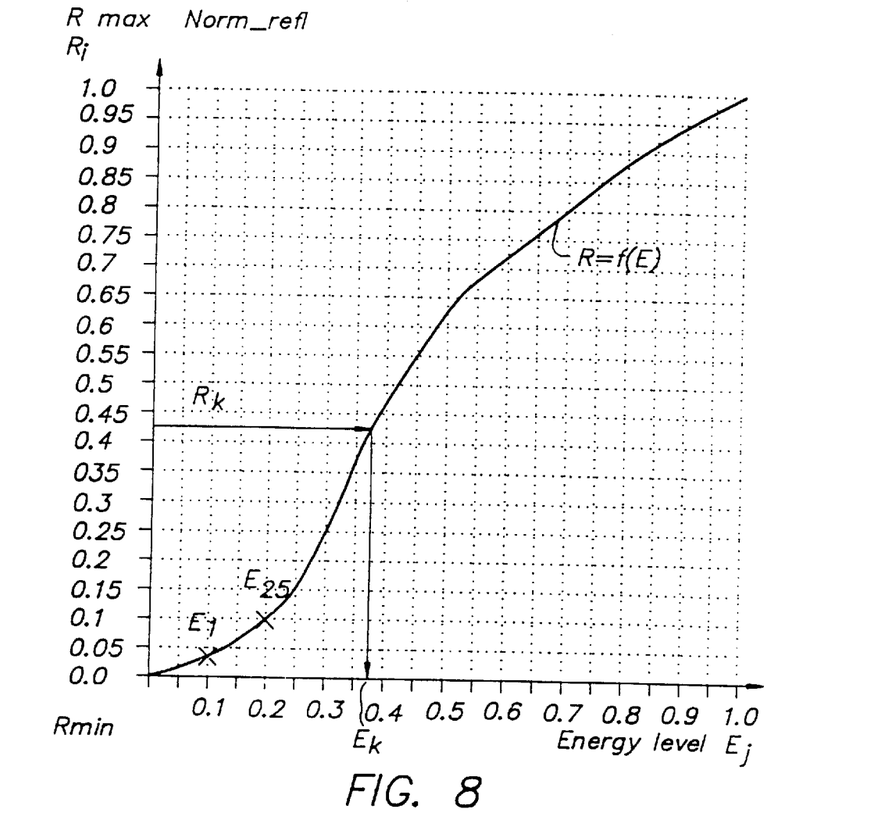
FIG. 8 is a graph giving the reflectance as a function of the energy level.

Preferably the energy levels must be selected such that the next energy level gives the same decrement in reflectance, for every energy level $E_j$. This can be achieved by the following method. First of all, a representative subset—e.g. 16—of all possible energy levels—e.g. 400—is selected. In this example energy level 1, 25, 50, etc. could be selected. It would be also possible to select all 400 energy levels to accomplish the following procedure. In that case, the subset is the full set of available energy levels. As shown in FIG. 7, with every energy level from the subset a patch 52 or 53 is output on the image carrier 51 or on the unit where the latent image is converted to a visible image as will be discussed further. The size of each patch is preferably 10 mm high and 10 mm wide. As such it can be easily measured by an integrating densitometer. Every patch consists of small isolated zones 54. The zones are spaced apart from each other such that they don't influence each other. Preferably, there is a spacing of at least two micro dots between each zone 54. The zone itself consists of a high density kernel 55, and a halo 56. The high density kernel is preferably one micro dot, imaged by the maximum energy level available. Also lower energy levels can be used for this kernel 55, as long as it is a stable energy level that gives a stable density on its own and stabilises the density of its neighbouring micro dots whatever energy level they have. The halo 56 is imaged by one energy level from the subset, e.g. $E_1$, $E_{25}$. Preferably, the width of the halo is one micro dot. As such, each zone 54 has nine micro dots, the center of which is imaged at maximum energy level and the other eight micro dots are imaged with the energy level from the subset. Each patch 52 is thus imaged by three energy levels: the lowest energy level in the background between the zones 54, a stable energy level and an energy level $E_j$ from the subset. On one carrier, different patches 52, 53 with different energy levels selected from the subset can be imaged. After imaging, the reflectance $R_j$ of each patch 52, 53, . . . having energy level $E_j$ (e.g. $E_1$, $E_{25}$, . . . ) is measured. This can be done by an integrating densitometer that will take the average density of a large amount of zones 54 together with the low density background. As shown in FIG. 8, the reflectance $R_j$ can be plotted against the energy level $E_j$. This curve has been obtained by performing the above described measurements on the Chromapress system marketed by Agfa-Gevaert N.V. Both the reflectance and the energy level are normalised to [0,1], by linear scaling and subtracting an offset. Moreover, the direction of the reflectance axis Norm_refl is inverted, giving an ascending function R=f(E). The measurement points are interpolated or approximated by a piecewise linear, quadratic or cubic curve, giving a continuous function R=f(E). Because we are interested to find the energy levels that give equal decrements in reflectance. the interval $[R_{min}, R_{max}]$ is divided in subintervals $[R_k, R_{k+1}]$, all having the same length on the reflectance axis.

The number of subintervals is the number of selected energy levels $E_k$ minus one. If we want to select sixteen energy levels, the number of intervals will be fifteen. Via inverse evaluation of the function R=f(E) in the points $R_k$ delineating the subintervals, we find the selected energy levels $E_k$.

Figure 9:
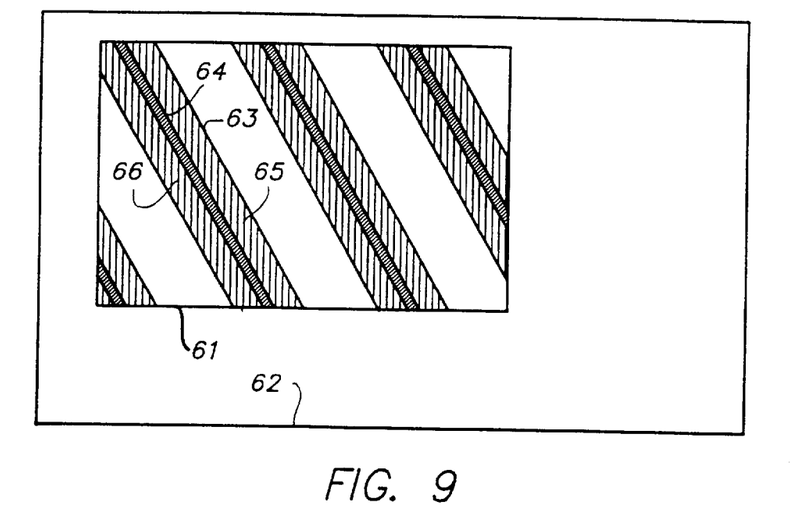
FIG. 9 shows another test page giving equivalent results as FIG. 7

It has been surprisingly found that the same method applied to an arrangement as sketched in FIG. 9 gives the same results. Here, the patch 61 on the image carrier 62 consists of parallel bands 63, spaced from each other at a distance such that there is no influence of the bands on each other. Each band 63 consists of a narrow central band 64 and two narrow side bands 65 and 66. As in the previous embodiment, the central band 64 is imaged by a high energy level that gives a stable density, stabilising also the density of the micro dots in the side bands. The side bands 65, 66 are imaged by energy levels $E_j$ from a subset of the available energy levels. The rest of the procedure is essentially the same, as described in relation with FIG. 7 and FIG. 8. The same energy levels $E_k$ are found. Moreover, if the bands are arranged such that on a full patch 61 the percentage of high density micro dots 64, the percentage of intermediate density micro dots 65 and the percentage of lowest density micro dots are the same as for the spotlike zones 54 in FIG. 7, then the reflectances $R_j$ measured are the same. This proofs that all energy levels produce consistently one density level as long as they are stabilised by a neighbouring micro dot.

It was found also that the reflectances $R_j$ are dependent on environmental parameters like temperature, humidity, further dependent on the type of toner and paper used, the age of the drum etc. Therefor it is advantageous to repeat these measurements for different parameters and store the results $E_k$ as a function of these parameters. If e.g. sixteen energy levels $E_k$ are selected, then it is very easy to store sixteen sets of selected energy levels. The parameters named above can be measured or kept track off, and whenever necessary, the energy level table 36 shown in FIG. 1 can be reloaded. This is a very fast operation that can improve dramatically the reproducibility of the output for different environments. This method to obtain a restricted set of energy levels $E_j$ summarises the whole printing engine in just the sequence of energy levels. The non linearities of the output device are corrected by this sequence. This method can preferentially be implemented in an automatic image density control system. The patches described above can be imaged on a specific location on the drum where the latent image is formed, toner is applied to this location, the location is illuminated by a LED or laserdiode and the reflected light is measured by a photosensitive sensor, that integrates over the patch.

Figure 10:
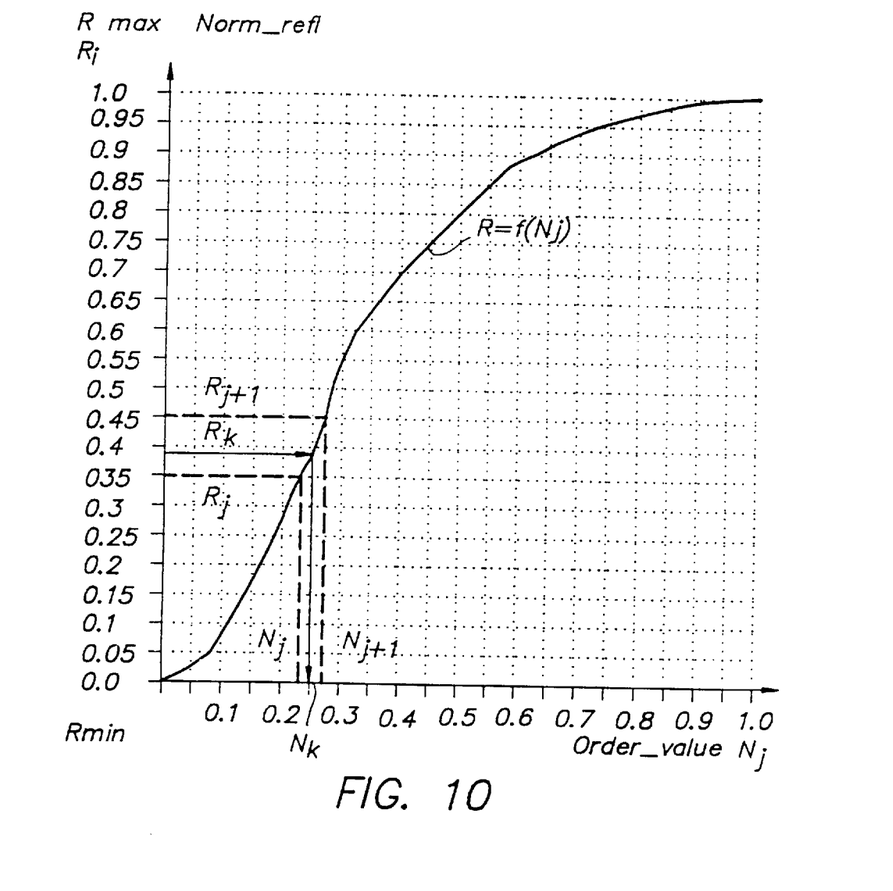
FIG. 10 is a graph showing the reflectance as a function of a set of ordered halftone cell types.

Once the restricted set of energy levels has been selected and the order for increasing the energy levels in the different pixel tone curves is fixed, we must select exactly L energy distributions over the supercell or L halftone cell types from all the possible distributions offered. L represents the number of intensity levels in the input image, and can be typically 256. Aspects due to the cell structure, such as dot gain can be linearised by the next method. If the number of selected energy levels N is sixteen, and the number of micro dots S*M in the supercell is 225, then there are N*S*M= 16*225=3600 halftone cell types numbered $N_j$ in a sequence to bring the supercell from lowest density to highest density. The order in which the energy levels are incremented for each micro dot can be given by the perturbated function G'(x,y,I) as described above. It is now possible to output patches of 10 mm by 10 mm for all 3600 halftone cell types in the sequence. The patch is overlaid with supercells, and each supercell within the patch has exactly the same distribution of energy levels, given by the sequence number $N_j$. The reflectance of the patch composed of supercells imaged by halftone cell type $N_j$ can be measured, giving a reflectance value $R_j$. The measured reflectances $R_j$ can be plotted against $N_j$ as shown in FIG. 10. Also this curve has been obtained by performing the above described measurements on the Chromapress system. Here again both axes are normalised to the interval [0,1] and the reflection axis is oriented inversely. This gives on the $R_j$ axis a point with minimum reflectance $R_{min}$ and a point with maximum reflectance $R_{max}$. The interval $[R_{min},R_{max}]$ is divided in L-1 equal subintervals, because it is an object to map the L intensity levels Ix,y linearly to a reflectance level R. This subdivision gives L-I subintervals $[R_k,R_{k+1}]$. For each value $R_k$ the value $R_j$ that is closest to it is searched and the corresponding sequence number $N_j$ is selected as a candidate for defining the energy distribution over the supercell for intensity level $I_k$ that will be mapped to reflectance $R_k$.

As the supercell gets larger, it becomes unpractical to list all arrangements $N_j$ found by the function G'(x,y,I). Therefore. a preselection of a subset of all arrangements $N_j$, preferably containing 16 elements, is made. It is possible to define as the subset the full set of all available halftone cell types $N_j$. Again the plot as shown in FIG. 10 is made, but the number of measurement points is less dense. For every required reflectance $R_k$, the index j is sought such that $R_j \leq R_k < R_{j+1}$. $R_j$ corresponds with sequence number $N_j$ and $R_{j+1}$ with sequence number $N_{j+1}$. Because in the previous step we made that an increment in energy level gives a constant decrement in reflectance level, and for every next element in the sequence one energy level of the complete supercell is incremented, we can linearly interpolate between $N_j$ and $N_{j+1}$ to find the sequence—number $N_k$ that gives the reflectance $R_k$:

$$N_k = N_j + (N_{j+1} - N_j)^* (R_k - R_j)/(R_{j+1} - R_j)$$

The function $R_j = f(N_j)$ is highly non-linear. Therefore, if only sixteen samples of this function are measured, it is advantageous to make a continuous interpolation or approximation by a piecewise non-linear function, such as a cubic spline function. Approximation will further offer the ability to smooth out measurement errors.

If the selected subset of combinations is such that it lists all possible combinations wherein the equivalent micro dots of different halftone cells in the same supercell always have the same energy level, then the difference in reflectance between the required reflectance $R_k$ and the obtained reflectance $R_{j+1}$ can be used to determine the number of equivalent micro dots that must get an energy increment. Which micro dots will get the increment is determined by the error function or the subordinate sequence given to the micro dots in the supercell.

It is obvious that this method can also be applied to elementary halftone cells, but the reflectance levels that can be really reached will be much coarser.

Although the present invention has been described with reference to preferred embodiments, those skilled in the art will recognise that changes may be made in form and detail without departing from the spirit and scope of the invention.

We claim:

1. A colour or multi tone reproduction comprising at least three halftone images printed on top of each other, wherein each of said images is rendered on a recorder grid of micro dots and comprises isolated halftone dots wherein:

the area outside the halftone dots has a minimum background density $D_{min}$;

the halftone dots include at least one micro dot having a density level $D_1$ and at least one micro dot having a different density level $D_2$, $D_1$ and $D_2$ both higher than $D_{min}$;

the centers of the halftone dots are arranged along a first set of parallel equidistant base lines having a first orientation and along a second set of parallel equidistant auxiliary lines having a second orientation different from the first orientation;

the points of intersection of any base line with any auxiliary line have an identical relative position with respect to the micro dot closest to said point of intersection.

2. The reproduction according to claim 1, wherein the orientation of the base lines is different for said halftone images.

3. The reproduction according to claim 1, wherein each of said halftone images further comprises isolated bands composed of adjacent micro dots having a density level higher than the background density $D_{min}$.

4. The reproduction according to claim 3, wherein the isolated bands include micro dots having a density level $D_1$ and micro dots having a different density level $D_2$, $D_1$ and $D_2$ both higher than $D_{min}$.

5. The reproduction according to claim 3, wherein said bands are centered along the base lines.

6. The reproduction according to claim 1, wherein said halftone images further comprise zones, larger than a parallelogram enclosed by two neighbouring base lines and two neighbouring auxiliary lines, consisting of micro dots each having a density level selected from two different density levels $D_1$ and $D_2$, both higher than $D_{min}$.

7. The reproduction according to claim 1, wherein the auxiliary lines of at least one halftone image have the same orientation as the base lines of another halftone image.

8. The reproduction according to claim 1, wherein all points of intersection of the base lines and the auxiliary lines of one halftone image have the same relative position with respect to the micro dot closest to said point of intersection as the corresponding points of at least two other halftone images.

9. The reproduction of claim 1, wherein the base lines for the three halftone images form a triangle that is not obtuse.

10. The reproduction of claim 9, wherein a triangle formed by base lines from the three halftone images is a sharp triangle.

11. The reproduction according to claim 1, wherein the base lines of the three halftone images are not parallel to recorder grid lines.

12. The reproduction according to claim 1, wherein two adjacent base lines for a first halftone image together with two adjacent base lines for a second halftone image form a parallelogram and the base lines for a third halftone image are parallel to the shortest diagonal line of said parallelogram.

* * * * *